United States Patent [19]

Van Nechel

[11] 3,996,401

[45] Dec. 7, 1976

[54] FLAT ROOFING LAMINATE HAVING MEANS TO ARREST TRANSMISSION OF DEFORMATIONS FROM THE BOTTOM SURFACE TO THE TOP SURFACE

[75] Inventor: Roger Van Nechel, Brussels, Belgium

[73] Assignee: Compagnie Generale des Asphaltes-Asphaltoc-S.A., Brussels, Belgium

[22] Filed: Feb. 28, 1975

[21] Appl. No.: 554,041

[30] Foreign Application Priority Data

Mar. 5, 1974 Belgium .............................. 141652
Feb. 6, 1975 Belgium .............................. 153142

[52] U.S. Cl. .............................. 428/101; 428/141; 428/198; 428/246; 428/250; 428/251; 428/337; 428/489
[51] Int. Cl.² ..................... D06N 5/00; D06M 7/14; D06M 11/04; E04D 1/28
[58] Field of Search .......... 428/101, 141, 198, 250, 428/251, 189, 337, 246, 489

[56] References Cited

UNITED STATES PATENTS

| | | | |
|---|---|---|---|
| 1,376,215 | 4/1921 | Millard | 428/198 |
| 1,788,121 | 1/1931 | Overbury | 428/141 |
| 2,771,824 | 11/1956 | Patch et al. | 428/101 |
| 3,053,716 | 9/1962 | Finan | 428/198 |
| 3,180,783 | 4/1965 | Walker et al. | 428/489 |
| 3,655,502 | 4/1972 | Yoshikawa | 428/198 |

*Primary Examiner*—J.C. Cannon
*Attorney, Agent, or Firm*—Sughrue, Rothwell, Mion, Zinn and Macpeak

[57] ABSTRACT

This invention relates to a flat roofing.

The flat roofing comprises: a lower support able to be submitted in use to deformations, an upper sealant covering, a disengagement sheet made of an elastic flexible and deformable material and arranged between said lower support and said sealant covering, lower adhesion zones connecting said disengagement sheet with the lower adjacent element of the roofing, in particular with said lower support, said lower adhesion zones being able to undergo horizontal relative displacements dependant on the deformations of said lower support, upper adhesion zones connecting said disengagement sheet with the upper adjacent element of the roofing, in particular with said upper sealant covering, and alternating with respect to said lower adhesion zones, and means for maintaining horizontally immobile said upper adhesion zones to one another.

In said flat roofing the deformations of said under support have no effect on the said upper sealant covering.

4 Claims, 8 Drawing Figures

FLAT ROOFING LAMINATE HAVING MEANS TO ARREST TRANSMISSION OF DEFORMATIONS FROM THE BOTTOM SURFACE TO THE TOP SURFACE

This invention relates to a flat roofing of the type comprising an upper sealant covering carried by a support, with the inter-position of a means for disengaging the sealant covering from the support.

In known flat roofings used in buildings, sealant coverings are adhered to supports on which they are mounted, either during the construction of stuck down roofings, or possibly after the construction of roofings which are not stuck down but are "ballasted" by mutual contact between the materials used, for example by temporary thermal action. Thus, as a result of adhering to the supports, the sealant coverings are constrained to follow the deformations of the supports, which consist of shrinkage, cracks, and expansion or contraction movements. The sealant coverings are accordingly subjected to primary horizontal forces and secondary vertical forces produced by the deformations of the supports. In order to protect the known sealant coverings for flat roofings against deformations of the supports, disengagement means have already been used between these sealant coverings and supports in order to prevent their mutual adhesion.

In a first known case relating to a stuck down or ballasted flat roofing, the lower surface of the sealant covering is provided with an additional layer comprising a bituminised reinforcement generally formed from a network of bituminised glass which is covered on its lower surface with a layer of coarse sand or gravel 2 to 4 mm thick, which is stuck on. This bituminised reinforcement may contain circular perforations having a diameter of about 20 mm. The non-perforated bituminous reinforcement may be laid freely on the support, covered with the sealant covering, and then ballasted to give a ballasted flat roofing. The bituminised reinforcement may be adhered to the support, for example at four or five points per square meter, and the sealant covering may be stuck down on top to give a stuck on flat roofing.

In contrast, the perforated bituminised reinforcement is adhered to the support with bitumen spread over its upper surface, the bitumen penetrating the perforations and producing adhesion by virtue of this assembly of adhesion sites, and the sealant covering is then stuck on to give a stuck on flat roofing. In this first case the means for disengaging the sealant covering with respect to the support is formed by the layer of coarse sand or gravel of the bituminous reinforcement, which is fixed, if necessary, to the support by an assembly of adhesion sites.

In fact, the layer of coarse sand or gravel is present to act as a diffusion layer for water vapour, rather than as a disengagement means between the sealant covering and the support. In fact, in the case of stuck on flat roofings, the localised point adhesion of the sealant covering to the support allows not only the passage of hot bitumen through the perforations of the bituminised reinforcement but also the infiltration of this hot bitumen into the layer of coarse sand or gravel. Thus, in this case, the adhesion sites of the sealant covering to the support extend beyond the perforations to an extent where they have a diameter of the order of 10 cm and the distance between them is also of the same order, with the result that these adhesion sites practically obliterate the supposedly free zones between the sealant covering, and the support and disengagement function of the layer of coarse sand or gravel is thus rendered inoperative. Finally, in both ballasted and stuck on flat roofings, the grains of sand or gravel applied to the lower surface of the bituminised reinforcement have a tendency to overlap or get caught on the support when this is made of a soft material. Also, when bitumen adheres to the support the grains of sand or particles of gravel penetrate the bitumen and destroy the disengagement function in the relevant zones.

In a second known case relating to a stuck on flat roofing, the lower layer of the sealant covering is provided with an asphalt membrane the lower surface of which is covered with a synthetic foam sheet. The sealant covering is adhered completely to the support by its synthetic foam sheet. By virtue of its elastic and flexible nature, the synthetic foam sheet forms the disengagement means between the sealant covering and the support.

The disengagement means in the second known case has the disadvantage of having only a restricted effectiveness, limited by the very poor elastic properties of the synthetic foam sheet, which tears above a certain stress value. Consequently, after localised destruction of the synthetic foam sheet, the repeated action of extension and contraction of the synthetic material at the site of the crack in the sheet, due to alternating deformations in the support, subjects the asphalt membrane to fatigue accelerated by bending and causes the sealant covering to break.

In a third know case relating to a stuck on flat roofing, the sealant covering support is formed by juxtaposed rigid sheets and the joins located at the extremities of the supports are bridged and covered by flexible strips generally formed from a glass fibre or kraft paper film. The flexible strips, 10 to 20 cm long, are placed freely on the two adjoining sheets and form a localised disengagement means at the joins. On the other hand, the sealant covering is adhered completely over the whole assembly of sheets and flexible support strips.

The disengagement means in the third case gives rise to various disadvantages. Its action is limited to the adjoining zones of the joins covered by the strips, and any movement which may occur at other parts of the support may cause tearing in the sealant covering. The flexible strips are not generally applied to joins between the elements other than those of the support. Moreover, the number of flexible strips to be put in place is particularly large in the case of support sheets of limited dimensions and thus involves a large amount of work in laying the strips. In addition, it is difficult to lay non stuck, flexible strips on the support sheets on account of their tendency to be displaced by the wind. Finally, over-flows of adhesive bitumen from the sealant covering are difficult to avoid with the flexible strips.

In a fourth known case relating to a ballasted flat roofing, a slip sheet such as a glass fibre or kraft paper film is arranged freely between the sealant covering and the support.

The slip sheet itself forms the disengagement means, but the sealant covering is liable to become displaced if there is any unevenness in the support. Moreover, the slip sheet is only effective if the materials with which it is in contact do not undergo any spontaneous adhesion, for example adhesion to the bitumen under a fixed weight for a certain period of time, and if these materials themselves do not produce any mechanical adherence, for example by the existence of rough and irregular regions in the materials.

Thus at the present time there is no effective way of disengaging the sealant covering relative to the support which enables the lower surface of a disengagement means to be placed on top of and adhered completely over the support, and enables the sealant covering to be placed on top of and adhered completely over the upper surface of the disengagement means.

The present invention provides a flat roofing comprising an upper sealant covering carried by a support, with the interposition of a means for disengaging the sealant covering with respect to the support, wherein the disengagement means comprises a disengagement sheet made of an elastic, flexible and deformable material, which is joined to the lower adjacent element of the roofing by lower adhesion zones which are able to undergo horizontal relative displacements dependent on the deformations of the support, and which is joined to the upper adjacent element of the roofing by upper adhesion zones which alternate with respect to the said lower adhesion zones and which are maintained horizontally immobile with respect to one another.

Because of the combination of the four features of the flat roofing according to the present invention, namely the presence of a disengagement sheet made of an elastic, flexible and deformable material, the adhesion of this disengagement sheet to adjacent elements of the roofing through upper and lower adhesion zones, the alternation of upper and lower adhesion zones, and the horizontal immobility of the upper adhesion zones with respect to one another, it will be apparent that constraints applied to the lower adhesion zones as a function of the deformations of the support, and which produce horizontal relative displacements of these lower adhesion zones, are dissipated throughout the thickness of the disengagement sheet, which is under stress following these constraints except opposite the upper adhesion zones. Thus, the displacements of the lower adhesion zones have no effect on the relative horizontal immobility of the upper adhesion zones. The result is that the deformations of the support do not damage the sealant covering.

The disengagement sheet will usually comprise a sheet of expanded rubber having a thickness of 2 to 4 mm, while the lower and upper adhesion zones will usually comprise adhesion studs on the disengagement sheet.

The upper adhesion zones are preferably maintained horizontally immobile with respect to one another by a sheet having a horizontally undeformable resistant structure. Such a resistant structure sheet constitutes a rigid support for the disengagement sheet so that it can change shape under the action of the deformations of the support.

The resistant structure sheet may be sutably formed from an asphalt membrane reinforced by glass gauze. The resistant structure sheet may be adhered to the disengagement sheet before the disengagement and resistant structure sheets are placed on the roofing, or may be brought into contact with the disengagement sheet when the disengagement sheet is placed on the roofing.

In one preferred construction, the lower and upper adhesion zones respectively of the disengagement sheet are protected before the disengagement sheet is placed on the roofing, for example during handling and transportation, by polyethylene films. These protective films melt opposite the adhesion zones during the laying of the roofing and ensure that the disengagement sheet adheres to the adjacent elements of the roofing. The protective films consequently do not obstruct the joining of the disengagement sheet to the adjacent elements of the roofing.

The invention will be further described, by way of example only, with reference to the accompanying drawings, in which.

Throughout the drawings, like reference numerals indicate like parts.

Figure 1:
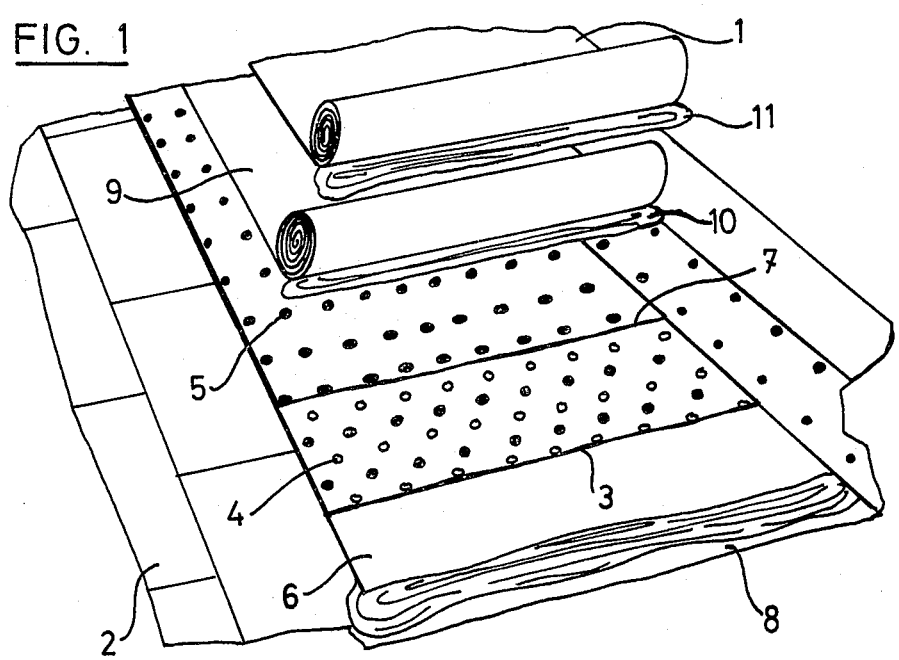
FIG. 1 is a perspective view of a first embodiment of a flat roofing according to the invention.
Figure 4:
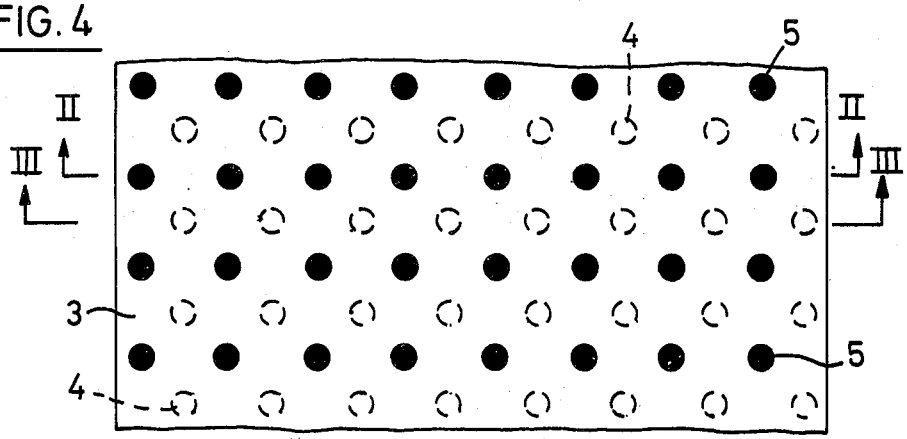
FIG. 4 is a plan view of the disengagement sheet on the flat roofing shown in FIG. 1, with its adhesion studs.
Figure 2:
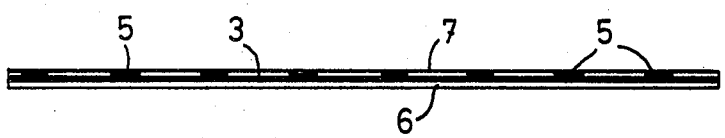
FIGS. 2 and 3 are vertical sections of the disengagement sheet shown in FIG. 4 respectively taken along the lines III—III and IV—IV in FIG. 4.
Figure 3:
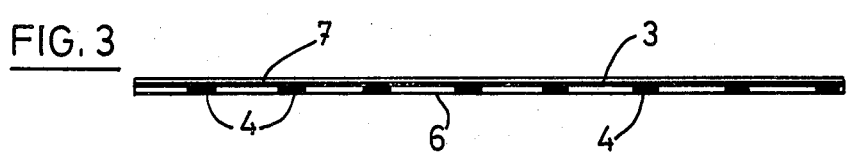

The flat roofings shown in the drawings comprise a sealant covering 1 carried on a support 2 with the interposition of a means for disengaging the sealant covering 1 relative to the support 2. The sealant covering 1 may suitably comprise an asphalt membrane, and the support 2 may be suitably formed from juxtaposed rigid sheets.

In the embodiment shown in FIGS. 1 to 4, the disengagement means essentially comprises a disengagement sheet 3 made of an elastic, flexible and deformable material, for example expanded synthetic rubber, which does not adhere to bitumen. The complete disengagement sheet 3 can be perforated and has a thickness of between 2 and 4 mm. The disengagement sheet 3 advantageously has the following mechanical properties:

Breaking load: ± 10 kg/cm$^2$
Percentage elongation: 120%
Modulus of elasticity at 100%: 10 kg/cm$^2$ The disengagement sheet 3 has on its lower surface lower adhesion zones formed by equidistantly spaced lower adhesion studs 4, and has on its upper surface upper adhesion zones 5 also formed by equidistantly spaced under adhesion studs in the same way as the lower adhesion studs 4. In addition, the lower adhesion studs 4 are arranged alternately with respect to the upper adhesion studs 5. Each surface of the disengagement sheet 3 contains 15 to 20 studs, each providing a surface area of 20 to 30 cm$^2$. The adhesion studs 4 and 5 each comprise a lump of suitable adhesive material which adheres strongly to the rubber of the disengagement sheet.

The disengagement sheet 3 is initially protected by two polyethylene films 6 and 7, of high density and very low thickness of the order of 0.025 mm. The lower protective film 6 covers the lower adhesion studs 4 and adheres thereto, while the upper protective film 7 covers the upper adhesion studs 5 and likewise adheres thereto. In this way the protective films 6 and 7 protect the disengagement sheet 3 with its adhesion studs 4 and 5 after its manufacture and during handling and transportation.

The disengagement sheet 3 is joined at its lower surface by the lower adhesion studs 4 to the adjacent lower element of the flat roofing, i.e. the support sheet 2.

During the placing of the disengagement sheet 3 on the support sheet 2, hot bitumen is spread in the form of a layer 8 on the support sheet 2 and the disengagement sheet 3 is unrolled over the bitumen layer 8. On contact with the hot bitumen, the lower protective film 6 melts very rapidly, thereby ensuring that the lower adhesion studs 4 contact the bitumen layer 8. In this way the lower adhesion studs 4 are adhered to the hardened bitumen layer and the disengagement sheet 3 is bonded at its lower surface to the support sheet 2 solely at points opposite the lower adhesion studs 4 and not between the latter, since the rubber constituting the disengagement sheet 3 does not adhere to the hot bitumen.

Under the effect of the deformations of the support sheet 2, which are often unavoidable, the lower adhesion studs 4 are able to undergo relative horizontal displacements which may be as much as 15 mm.

In contrast to the lower adhesion studs 4 which may move horizontally relative to one another, the upper adhesion studs 5 of the disengagement sheet 3 are maintained horizontally immobile with respect to one another. The upper adhesion studs 5 thus always remain in the same relative positions. For this purpose, the disengagement sheet 3 is bonded at its upper surface by the upper adhesion studs 5 to the adjacent upper element of the roofing, i.e. a resistant structure sheet 9 which is horizontally undeformable and rigid.

The resistant structure sheet 9 comprises an asphalt membrane with a glass tissue reinforcement having in general a high tensile strength and a very low elongation, the thickness of the membrane being from 2 to 3 mm. In the embodiment shown in FIGS. 1 and 4 the resistant structure sheet 9 is positioned on the disengagement sheet 3.

When the resistant structure sheet 9 is placed on the disengagement sheet 3, previously placed on the support sheet 2, a layer 10 of hot bitumen is spread over the upper protective film 7, while the resistant structure sheet 9 is unrolled on the layer 10. The hot bitumen of the layer 10 causes very rapid melting of the upper protective film 7 so that the upper adhesion studs 5 are bonded to the resistant structure sheet 9, thereby ensuring a permanent bond between the disengagement sheet 3 and the resistant structure sheet 9.

After the resistant structure sheet 9 has been placed in position, the sealant covering 1 is fixed in position by being adhered over its whole surface with a spread layer 11 of hot bitumen.

Figure 5:
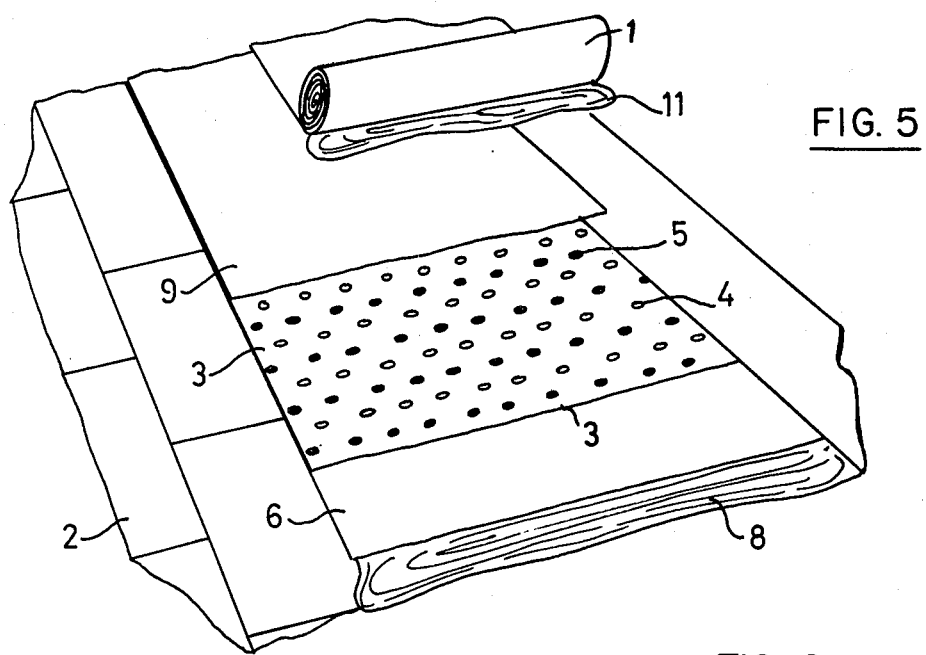
FIG. 5 is a perspective view of a second embodiment of a flat roofing according to the invention.
Figure 6:
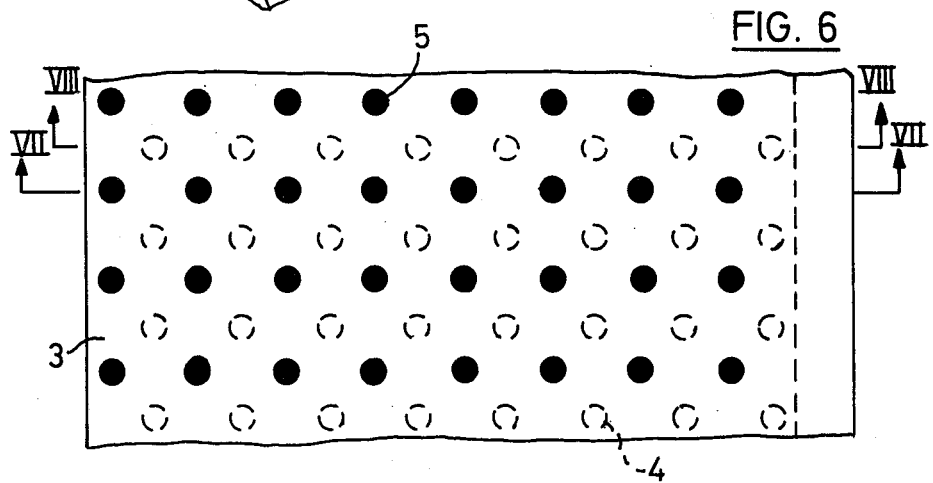
FIG. 6 is a plan view of the disengagement sheet of the flat roofing shown in FIG. 5, with its adhesion studs.
Figure 7:
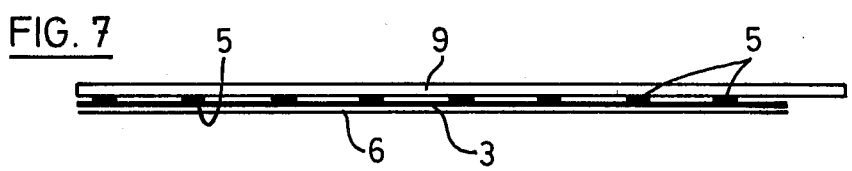
FIGS. 7 and 8 are vertical sections of the disengagement sheet and of a resistant structure sheet respectively taken along the lines VII—VII and VIII—VIII in FIG. 6.
Figure 8:

The flat roofing shown in FIGS. 5 and 8 essentially differs from that shown in FIGS. 1 to 4 in that the resistant structure sheet 9 is adhered to the disengagement sheet 3 before they are respectively laid, instead of being placed on the disengagement sheet 3. In this case the whole arrangement of the disengagement sheet 3 with its adhesion studs 4 and 5 and its lower protective film 6 (but without the upper protective film 7) and the resistant structure sheet 9 forms a fabricated element which can be handled, in particular rolled up and unrolled, without difficulty.

The disengagement and resistant structure sheets are still placed on the support sheet 2 by firstly spreading a layer 8 of hot bitumen on the support sheet 2 and then unrolling the combined sheet. Upon contast with the hot bitumen, the lower protective film 6 melts and ensures that the lower adhesion studs 4 adhere to the support 2. Similarly, the sealant covering 1 is placed on the previously laid and fixed combined sheet and is adhered over its whole surface area with the spread layer 11 of bitumen.

It should be noted that the resistant structure sheet 9 overlaps one edge by about 10 cm in order to ensure that it covers the adjacent disengagement sheet at the moment it is laid, the disengagement sheet already being in place along this edge.

In the two flat roofings described above, the upper adhesion studs are horizontally immobile with respect to one another on account of the resistant structure sheet. However, these upper adhesion studs may be immobilised directly by the sealant covering itself insofar as the latter contains at least one reinforcement having a high tensile strength and a very low elongation.

What I claim is:

1. A flat roofing comprising:
    a lower support able to be submitted in use to deformations
    an upper sealant covering
    a disengagement sheet made of an elastic flexible and deformable material and arranged between said lower support and said upper sealant covering
    lower adhesion zones connecting said disengagement sheet with the lower adjacent element of the roofing, in particular with said lower support, said lower adhesion zones being able to undergo horizontal relative displacements dependant on the deformations of said lower support
    upper adhesion zones connecting said disengagement sheet with the upper adjacent element of the roofing, in particular with said upper sealant covering, and alternating with respect to said lower adhesion zones
    and a horizontally undeformable structural sheet adhesively associated with the upper adhesion zones, preventing relative horizontal movement of said upper adhesion zones and effect on said upper sealant covering by deformations of said lower support.

2. A flat roofing as claimed in claim 1 wherein said disengagement sheet is a sheet of expanded rubber having a thickness of 2 to 4 mm.

3. A flat roofing as claimed in claim 1 wherein said lower and upper adhesion zones comprise adhesion studs distributed over said disengagement sheet.

4. A flat roofing as claimed in claim 3 wherein said horizontally undeformable structural sheet comprises a membrane reinforced with glass gauze.

* * * * *